US010514808B2

(12) United States Patent
Riedel

(10) Patent No.: US 10,514,808 B2
(45) Date of Patent: Dec. 24, 2019

(54) METHOD, APPARATUS AND SYSTEM FOR COMMUNICATION WITH A SENSOR

(71) Applicant: Inova Semiconductors GmbH, München (DE)

(72) Inventor: Michael Riedel, Buchbach (DE)

(73) Assignee: Inova Semiconductors GmbH, München (DE)

( * ) Notice: Subject to any disclaimer, the term of this patent is extended or adjusted under 35 U.S.C. 154(b) by 401 days.

(21) Appl. No.: 15/107,708

(22) PCT Filed: Dec. 19, 2014

(86) PCT No.: PCT/EP2014/078681
§ 371 (c)(1),
(2) Date: Aug. 23, 2016

(87) PCT Pub. No.: WO2015/097080
PCT Pub. Date: Jul. 2, 2015

(65) Prior Publication Data
US 2016/0370895 A1 Dec. 22, 2016

(30) Foreign Application Priority Data
Dec. 23, 2013 (DE) .................. 10 2013 114 820

(51) Int. Cl.
*G06F 3/041* (2006.01)
*G09G 5/00* (2006.01)
(Continued)

(52) U.S. Cl.
CPC .............. *G06F 3/044* (2013.01); *B60K 35/00* (2013.01); *G06F 3/0416* (2013.01); *G09G 5/003* (2013.01);
(Continued)

(58) Field of Classification Search
None
See application file for complete search history.

(56) References Cited

U.S. PATENT DOCUMENTS

2013/0124763 A1* 5/2013 Kessler ............... G06F 13/4295
710/110
2013/0152141 A1 6/2013 Chen

FOREIGN PATENT DOCUMENTS

DE 102008061712 6/2010
DE 102008061712 A1 * 6/2010 ......... H04L 12/4035
(Continued)

OTHER PUBLICATIONS

"Japanese Application No. 2016-542235, Notification of Reasons for Refusal dated Jan. 8, 2018", (dated Jan. 8, 2018), 9 pgs.
(Continued)

*Primary Examiner* — Amr A Awad
*Assistant Examiner* — Maheen I Javed
(74) *Attorney, Agent, or Firm* — Schwegman Lundberg & Woessner, P.A.

(57) ABSTRACT

The described device is used for communicating with a sensor, especially in the form of a touch-sensitive input and/or output device, e.g. a touch screen, via a control unit that can be controlled using a remote controller. A functional block that performs signaling to communicate with the control unit is provided in a receiver component which is or can be connected to a transmitter component via a communication link.

10 Claims, 2 Drawing Sheets

Figure 1:
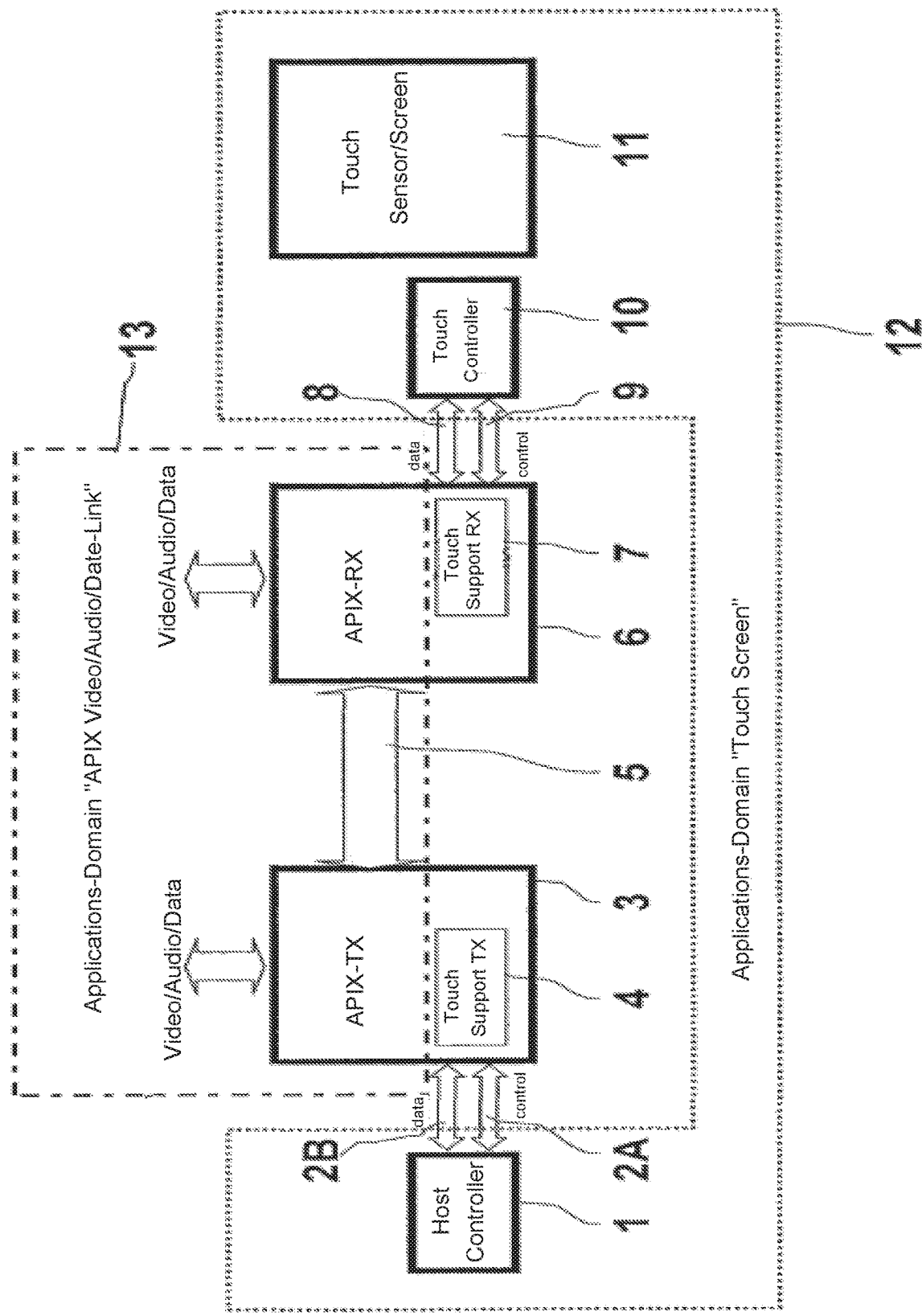

(51) Int. Cl.
    *G06F 3/044* (2006.01)
    *B60K 35/00* (2006.01)
(52) U.S. Cl.
    CPC .. *B60K 2370/1438* (2019.05); *G09G 2380/10* (2013.01)

(56) References Cited

FOREIGN PATENT DOCUMENTS

JP          2009210360        9/2009
WO     WO-2015097080       7/2015

OTHER PUBLICATIONS

"International Application No. PCT/EP2016/001074, International Preliminary Report on Patentability dated Oct. 24, 2017", (dated Oct. 24, 2017), 10 pgs.

"International Application No. PCT/EP2014/078681, International Search Report and Written Opinion dated Mar. 20, 2015", (dated Mar. 20, 2015), 10 pgs.

Römer, Markus, "APIX Industrial—Standard connectivity for industrial display applications", Inova Semiconductors, White Paper, Version 1.0, (Oct. 1, 2009), 21 pgs.

* cited by examiner

METHOD, APPARATUS AND SYSTEM FOR COMMUNICATION WITH A SENSOR

PRIORITY CLAIM TO RELATED APPLICATIONS

This application is a U.S. national stage application filed under 35 U.S.C. § 371 from International Application Serial No. PCT/EP2014/078681, which was filed 19 Dec. 2014, and published as WO2015/097080 on 2 Jul. 2015, and which claims priority to German Application No. 10 2013 114 820.4, filed 23 Dec. 2013, which applications and publication are incorporated by reference as if reproduced herein and made a part hereof in their entirety, and the benefit of priority of each of which is claimed herein.

The invention is directed towards a method, a device and a system for communication with a sensor. Alternatively or in addition, the invention is directed towards a method, an apparatus and a system for controlling of a sensor, especially a touch-sensitive input device, for instance in the form of a touch-sensitive screen, that means a so-called "touch-screen".

The sensor can be implemented for instance as a capacitive input device such as a touch-sensitive input device, for instance in the form of a touch-sensitive screen, that means a so-called "touchscreen", and/or also as an input and output device comprising a display field and a keyboard, for instance in the form of a keyboard being displayed on a screen and being operable by means of a mouse or a cursor or by means of direct touch.

For the controlling and/or the reading out of the sensor, for instance of the capacitive input device or the touch-sensitive screen, a control unit can be present being connectively coupled with the sensor.

At greater distances between the control unit and the sensor, that means the input/output device and the control unit, respective connections are required that can be implemented wired or wireless and need to or have to transmit larger amounts of data. Hereby latency, meaning signaling delay, or signal tampering may occur influencing the reliability of the controlling.

With the present invention the accuracy, for instance at low latencies or delay times, and the correctness of the communication between a sensor and a remotely arranged control unit is to be improved.

With the invention a device according to the independent apparatus claim along with a method according to the independent method claim is provided. Advantageous embodiments of the invention are provided by means of the dependent claims.

According to an aspect of the invention, a device for communication with a sensor is provided, especially in the form of a touch-sensitive input and/or output device, for instance a touchscreen, with a control unit, being controllable by means of a remotely arranged controller. Here, a functional block is provided within a receiver component, performing signaling for communication with the control unit. The receiver component is or can be connected to a transmitter component via a communication link.

Also the transmitter component may comprise a functional block being implemented as sensor interface for the controller and be arranged for communication with the functional block of the receiver component via the communication link.

The device can preferably be implemented for usage in a motor vehicle. Thereby the communication link can be formed as a coaxial cable, a single-wired cable, a two-core cable, in general a multi-core cable, for instance a four-core cable, an optical communication link, allowing an undisturbed, optionally tap-proof transmission.

Both the control unit and the receiver component can be connected via two communication paths, one of which serves for data transmission and the other serves for signaling between the control unit and the functional block.

The device can be implemented for performing in a first phase an initialization between the control unit and the controller. In a second phase the data transmission as such can be accomplished between the sensor and the controller.

The functional block of the transmitter component can for instance be configured as sensor-interface for the controller. The functional block of the receiver component can hereby or alternatively be arranged as an interface, especially a controller-interface, for the control unit.

The functional block can for instance perform the signaling for communication with the control unit, such that via the preferably as a serial data link arranged connection link solely the data required for the controller (control unit) are to be transmitted.

According to a further aspect of the invention a system for usage in a motor vehicle is provided for display controlling of at least one display being present in a motor vehicle, which can comprise a device according to one of the above implementations.

According to a further aspect of the invention a method for communication with a sensor, especially in the form of a touch-sensitive input and/or output device, for instance a touchscreen, is provided, wherein a control unit is controlled via a remotely arranged controller (control unit), and a receiver component, being connected with the transmitter component via a communication link, performs signaling via a functional block for communication with the control unit.

In this method the first functional block can serve as a proxy of the remotely arranged controller 1 forming a communication endpoint from the perspective of the sensor-control unit 10. In case the sensor has data to be read and interpreted by the host controller, the first functional block can for instance fetch the data from the sensor and transmit them to a second functional block in the transmitter component. The other way round the first functional block can in case the first functional block receives data from the second functional block to be handed over to the control unit or to be read by the control unit perform like a host controller, accomplish these tasks and send the data back to the second functional block as a reply, if necessary. The second functional block can from the perspective of the controller 1 perform like a proxy in its communication with the sensor-control unit.

In this method a query can be transmitted to the first functional block in the receiver component in case the sensor has data to be read and interpreted by the controller. Alternatively, the first functional block can test the control unit of the sensor periodically regarding available data (polling).

In this method in a first phase an initializing between the control unit and the controller can be performed and in a second phase the data transmission as such can be performed between the sensor and the controller.

The invention is furthermore directed towards a computer program or a computer program product, comprising instructions which, when executed on a computer or a processor, implement the accomplishment of the proposed method.

In the following the invention is described by means of an embodiment under reference to the figures.

In FIG. 1 an embodiment of the inventive device is depicted.

Figure 2:
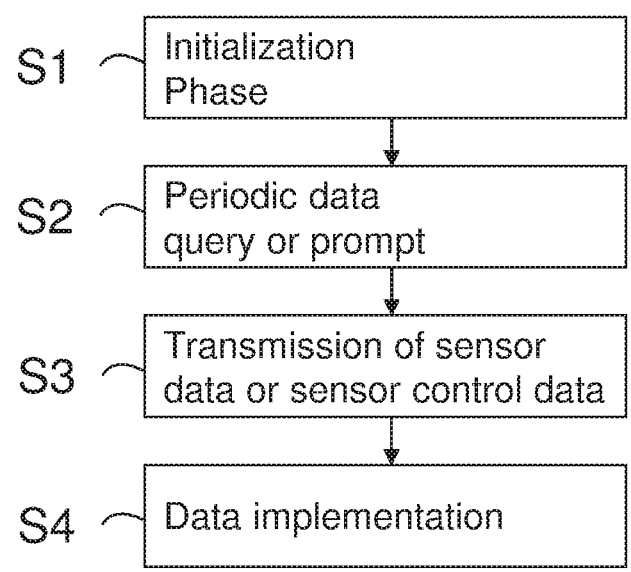

FIG. 2 shows an embodiment of the inventive method.

In the embodiment shown in FIG. 1 the inventive device is a control unit 1, for instance in the form of a microprocessor or microcontroller, being in connection via a communication link 2A, 2B with a component 3 being for instance implemented as a transmitter component. The communication link 2A serves in this embodiment for the transmission of control data (control), whereas over the communication link 2B data (data) are transmitted according to this embodiment. The component 3, which can be implemented for the usage in the automotive field or in motor vehicles for data transmissions of data, such as visual data (image data) and/or acoustical data and/or control data (automotive pixel transmitter, APIX-TX), comprises an optional functional block 4 in the form of a support function for a sensor, being for instance implemented as a touch-sensitive screen (touchscreen) 11.

A further electronic component 6 being implemented for instance as a component for the usage in the automotive field or in motor vehicles for data reception such as visual data (image data) and/or acoustical data or in general as a receiver (automotive pixel receiver, APIX-RX), comprises a functional block 7 in the form of a support function for the support of the sensor, that means of the touch-sensitive screen 11. The functional block 7, that means the support unit, can be implemented as a program or function in software implementation and can be named "touch support". A connection 5 provides a link for the connection between both components 3, 6 and can for instance be implemented as a signaling link, for instance as four- or multi-core link, being directly connected to the components 3 and 6 and connects them. Alternatively, the link 5 can be implemented as a coaxial cable, as a single- or multi-core cable, as optical transmission link, optocoupler, radio transmission link and/or in a further fashion.

The control unit 10 is connected with the support unit 7 via connections 8, 9, wherein for instance via the connection 8 solely data from and to the sensor 11 are transmitted, wherein the connection 9 is implemented for the transmission of protocol words and protocol data, for instance for signaling. The control unit 10 is in FIG. 1 depicted to be separate from the sensor 11, but can be integrated and is directly in connection with the sensor 11 for its controlling.

The support unit 7 being implemented in the component 6, for instance the receiver, forms according to this embodiment the interface to the control logic 10 of the sensor 11 being implemented as touchscreen. The function 7 takes over the signaling to the control unit (control logic, touchCtrl) 10 of the touch-sensitive screen (touchscreen) 11. The function 7 provides the signaling, for instance via a respective protocol, for communication with the control unit 10. Via the connection 5, that means the respective link, the important data for the microcontroller 1 are to be transmitted exclusively.

In the embodiment being depicted in FIG. 1 a host system that means an application domain 13 in the form of "APIX" or "APIX video/audio/data-links", transports data of a further application domain 12, namely the application domain "touchscreen".

The embodiment being depicted in FIG. 1 is characterized amongst others by the advantages of low latencies of the communication as well as the signaling, as well as by means of the touch protocols, as merely a local communication between the functional block 7 and the control unit 10 on the one hand side, and between the functional block 4 and the microcontroller 1 on the other hand side, is required and consequently therefor no communication via the connection 5 is required. This configuration, in which via the connection 5 no signaling has to be transmitted between the component 1 and 10, saves bandwidth, as the amounts of data to be transmitted via the connection 5 are respectively reduced. Furthermore, the error-proneness is reduced, as merely very short communication links between the functional block (support unit) 7 and the control unit 10 are sufficient. A further advantage is provided in that also different controllers are supported at a uniform data format.

The system being depicted in FIG. 1 can be implemented as a controller-sensor-system according to an embodiment, in which the controller, namely the microcontroller 1, functions as master and the sensor 11 functions as slave of the communication relationship between these two components. Hereby the slave, namely the sensor 11, may optionally have the possibility in such a system to inform the master, namely the microcontroller 1, that communication is necessary.

In general, such a data communication may comprise two phases (1), (2) to be distinguished regarding their quality in several cases.

In the first phase (1) the microcontroller 1 (master) reads and writes within a unique and restricted time interval data from or to the sensor 11, for instance for configuring the sensor 11 and configuring it towards the desired operation mode. This phase (1) can for instance be performed as an initialization phase after a reset (reset) of the system or after the application of the supply voltage. This is demonstrated in step S1 of FIG. 2.

In phase (2) the microcontroller 1 (master) periodically reads data from the sensor 11 or is alternatively requested to periodically read data by the sensor 11. This procedure of reading data or the procedure of requesting data transmissions is typically performed in exactly the same fashion regarding the logical and physical bit structure, for instance regarding address and number of data. This phase (2) typically provides the normal operation mode and function of the controller-sensor-system after initialization, that means after the phase (1). This is demonstrated in steps S2, S3 in FIG. 2.

The communication between the control unit 1 (for instance the controller or microcontroller) and the sensor 11 is performed physically via a connection according to this embodiment, which is implemented as a peripheral-bus, which is typically merely suitable for bridging short distances on a circuit board or few meters of cable. According to one or several embodiments a UART, I$^2$C or a SPI-bus can be applied. Hence, the communication data are transmitted by trailer shipment of the Apix application.

According to one or several embodiments the control unit 1 and the sensor 11 can be significantly remotely arranged, wherein other transmission technologies can be applied and/or an existing communication channel, such as link 5, on which already other data are transported according to a protocol, or for such data for controlling the sensor 11 or transmission of sensor data can be used. These data can for instance be embedded by means of respective signaling or protocols in an already existing data flow such that no additional communication cables being exclusively used by the control unit (controller) 1 and the sensor 11 in-between the transmitter and the receiver are necessary. Hereby the fact that a different, shared communication channel 5 between the component 3 (sender) and the component 6

(receiver) is used, may remain completely transparent for the control unit (controller) 1 and the sensor 11.

According to embodiments of the invention the communication data of the control unit (controller) 1 and the sensor 11 occupy merely a minimum of transmission capacity from the perspective of the data transmission between the component 3 and the component 6. Even if the connection 5 serving as "carrier-channel" is not used exclusively, the controller-sensor communication is performed correctly and without undesired timely delays due to the reduction of the data to be transmitted via this channel, and even in the case when communication data are temporarily stored to transmit them correctly according to the protocol and the transmission method of the "carrier-system", namely the components 3, 6 (for instance framing, serialization/deserialization).

In the embodiment according to FIG. 1 the component 3 serving as transmitter according to FIG. 1 and the component 6 serving as receiver respectively comprise the functional block 4, 7 ("touch support") via which the control unit (controller) 1 and the sensor 11 respectively are coupled towards the existing transmission system between the components 3, 6. The control unit (controller) 1 can optionally instruct the functional block 7 of the component 6 to perform all operations of phase (1) step by step with the sensor 11, delivers all data being necessary therefor and receives the replies of the sensor 11, which component 6 collects and transmits them to component 3 at the interface to component 3, that means via the connection 2. Regarding the sensor 11 the component 6 functions as communications-master and acts as proxy of the control unit (controller) 1, wherein it uses a similar interface.

During the phase (2) the control unit (controller) 1 does not need to contact the sensor 11 via the components 3 and 6 according to this and/or a further embodiment, such that the schema of the original communication can remain unchanged. When the sensor 11 has data which shall be or have to be read by the master, that means the controller 1, the functional block 7 sends instructions, for instance in the form of an interruption request (interrupt-request) to the component 6, which thereupon collects the data from the sensor 11 like a controller and sends them transparently to the component 3. Upon noting the reception of the data through the functional block 4 in component 3, the component 3 uses the sensor-interface at the controller 1, that means the interface between the controller 1 and the component 3 at the control unit (controller) in the connection area of connection 2, for indicating the presence of data to the controller 1. Thereupon the control unit (controller) 1 collects the data in an unamended fashion, like a direct connection with sensor 11, wherein the component 3 takes over the role of the sensor 11.

As depicted in FIG. 1, one or both of the two components 3, 6 serve for the transmission of data, for instance video/audio/data to respective sources, sinks or components in-between.

The functional blocks "touch support" 4, 7—being exemplarily depicted as components of an APIX based "carrier system"—translate between the logical and physical format of the carrier system-communication (between component 3 and 6) and the communication between host-controller 1 and the control unit 10 of the sensor-system.

From the perspective of the sensor-control unit 10 the block 7 acts as proxy of its communication-endpoint (sensor host controller). When the sensor 11 has data to be read and interpreted by the host controller, then for instance a request arrives in the block 7 in components 6. Alternatively, the block 7 could periodically test the control unit 10 of the sensor 11 regarding available data (polling). In case valid data are present in the sensor 11, the function 7 collects the data from the sensor 11 and sends them to the functional block 4 in component 3. The other way round, when the block 7 receives data from block 4 to be forwarded to control 10 or to be read by the control unit 10, block 7 takes over action like a host controller, accomplishes these tasks and sends data as reply back to the block 4 as well.

Block 4 acts from the perspective of the host-controller 1 as proxy regarding its communication with the sensor-control unit 10.

These "touch support" blocks 4 and 7 form in the sense of the OSI-layer-model a layer offering the sensor-system ("upper layer") services for communication in physical and logical unamended format, by using services itself of the carrier system ("lower layer", here: APIX) and by implementing a suitable protocol for this task between its own instances (blocks 4 and 7).

The service data units (SDU) of blocks 4 and 7 are embedded in protocol data units (PDU) of the carrier system APIX independent from being signaling or payload-data, and are transmitted on the existing links 5 in multiplex together with the other data to be transported between the transmitter and receiver component. Thereby, the necessity of the usage of a further transmission system being suitable for transmitting data over great distances is omitted and furthermore that exclusively the data of the application domain of the touchscreen (controller 1, 10 and 11) are to be transported. This results in a reduction of technical effort for implementing the described application scenarios.

By means of this "proxy" principle (proxy-principle) it is avoided that an additional communication between the controller 1 and the component 6 respectively between the controller 1 and the sensor 11 is necessary via components 3, 6. Therefore, negative influence regarding the behavior regarding time of the integrated communication system can be avoided, as in the other case frequent requests would together occupy large transmission capacities, wherein seldom requests would lead to greater latencies.

In phase (2) the carrier system, comprising transmitter-component 3, the receiver component 6 and the connection 5 forming a transmission channel in-between them, is completely transparent. In contrast the optional controller 1 can use its knowledge regarding the existence of the transmitter component 3 depending on the implementation of the system and can instruct the necessary interactions between the receiver component 6 and the sensor 11, that means generate respective instructions and transmit them. Alternatively, the transmitter component 3 can already in phase (1) act as a sensor 11 and is therefore transparent for the controller 1.

In FIG. 2 an embodiment of the inventive method is depicted. In a step S1 an initialization phase is performed in which the controller 1 configures the sensor 11 and configures it towards the desired working mode. The step S1 can for instance be accomplished at the switching on of the system comprising the device according to FIG. 1 or after a reset.

In a step S2 a preferably periodical request of the data being provided by the sensor 11 is performed by block 7. Alternatively, the sensor 11 may in step S2 periodically request the block 7 to read the data being provided by sensor 11.

In a step S3, which can be performed before, after or at the same time with step S2, the data being generated by sensor 11 or to be transmitted via the functional block 7 to sensor 11 are transmitted to the connection link 8 or 9, respectively to link 5.

In a step S4, which can be performed before, after or at the same time with step S3, the data are transferred from the communication links 2 and 5 via the functional block 4 in the transmitter component 3 and are transmitted to the respective communication link 2 or 5, respectively.

According to one or several embodiments the system being depicted in FIG. 1 is used in a motor vehicle and serves for transmission of control or payload data, for instance image data, from a touch-sensitive screen, being input by a user, to the controller 1 and respectively in the other direction from the controller 1 to the touch-sensitive screen 11, to be visually displayed on it. The embodiment can form a part of a motor vehicle control system or respectively of a motor vehicle display system.

Furthermore, a computer program or a computer program product is provided, comprising instructions, implementing the accomplishment of the provided method when being executed on a computer or processor.

The description of embodiments as provided above is not to be classified as being restrictive. Further, amendments, supplementary aspects, and leaving out aspects being recognizable by the skilled person are likewise within the scope of the invention.

The invention claimed is:

1. An apparatus for communication with a touch-screen sensor, the apparatus comprising:
    a sensor control unit controlled using a remote host controller, and
    a receiver coupled via a connection link with a transmitter component,
    wherein a first interface is configured to perform signaling and data transmission to communicate with the sensor control unit, the first interface is provided in the receiver and is arranged for communication with a second interface,
    wherein the transmitter component comprises the second interface being coupled with the host controller, the second interface is configured to function as a sensor interface for the host controller and is arranged for communication with the first interface of the receiver via the connection link,
    wherein the first interface of the receiver is arranged as a controller-interface for the sensor control unit and is configured to perform the signaling and data transmission for communication with the sensor control unit via the connection link, wherein the connection link is a serial data link for only the host controller, and
    wherein the first interface is configured to serve as a proxy of the host controller for the sensor control unit, thereby when the touch-screen sensor has data to be read and interpreted by the host controller, the first interface is configured to fetch the data from the touch-screen sensor and transmit the data to a second interface in the transmitter component, or the first interface is configured to receive data from the second interface to be read by the sensor control unit and is configured to respond to the data, wherein the second interface is configured to serve as a proxy of the host controller.

2. The apparatus according to claim 1, being implemented for usage in a motor vehicle.

3. The apparatus according to claim 1, wherein the communication link is formed as a coaxial cable, a single-wired or a multi-core cable, for instance a four-core cable.

4. The apparatus according to claim 1, wherein the sensor control unit and the receiver are coupled via two communication paths, one of which serves for data transmission and the other serves for signaling between the sensor control unit and the interface.

5. The apparatus according to claim 1, being implemented to perform in a first phase an initialization between the sensor control unit and the host controller, and in a second phase accomplishing the data transmission as such between the sensor and the host controller.

6. A system for usage in a motor vehicle for display controlling of at least one display being present in a motor vehicle, comprising an apparatus according to claim 1.

7. A method for communication with a touch-screen sensor, the method comprising:
    wherein a sensor control unit is controlled via a remotely arranged host controller, and a receiver is coupled via a connection link with a transmitter component, and is configured to perform signaling via an interface for communication with the sensor control unit,
    wherein a first interface of the receiver is arranged as a controller-interface for the sensor control unit and is configured to perform the signaling and data transmission for communication with the sensor control unit via the connection link, wherein the connection link is a serial data link for only the host controller, and
    wherein the first interface is configured to serve as a proxy of the host controller for the sensor control unit, thereby when the touch-screen sensor has data to be read and interpreted by the host controller, the first interface is configure to fetch the data from the touch-screen sensor and to transmit the data to a second interface in the transmitter component, or the first interface is to receive data from the second interface to be read by the sensor control unit and is configured to respond to the data, wherein the second interface is configured to serve as a proxy of the host controller.

8. The method according to claim 7, wherein a query is to be transmitted to the first interface in the receiver in case the sensor has data to be read and interpreted by the host controller, or alternatively, the first interface is to test the sensor control unit of the sensor periodically regarding available data (polling).

9. The method according to claim 7, wherein in a first phase an initializing between the sensor control unit and the host controller is performed and in a second phase the data transmission as such is to be performed between the sensor and the host controller.

10. A tangible computer-readable medium having no transitory signals and containing instructions that, when executed by one or more hardware-based processors of a machine, cause the machine to perform operations comprising the method according to claim 7.

* * * * *